United States Patent [19]

Colon-Bonet

[11] Patent Number: 5,404,324
[45] Date of Patent: Apr. 4, 1995

[54] METHODS AND APPARATUS FOR PERFORMING DIVISION AND SQUARE ROOT COMPUTATIONS IN A COMPUTER

[75] Inventor: Glenn T. Colon-Bonet, Ft. Collins, Colo.

[73] Assignee: Hewlett-Packard Company, Palo Alto, Calif.

[21] Appl. No.: 146,895

[22] Filed: Nov. 1, 1993

[51] Int. Cl.$^6$ ............................ G06F 7/52; G06F 7/38
[52] U.S. Cl. ...................................... 364/761; 364/748
[58] Field of Search ............... 364/748, 761, 764, 766, 364/767, 752, 745

[56] References Cited

U.S. PATENT DOCUMENTS

| 4,949,295 | 8/1990 | Stearns | 364/748 |
| 4,996,660 | 2/1991 | Beacom et al. | 364/748 |
| 4,999,801 | 3/1991 | Katsuno | 364/748 |
| 5,132,925 | 7/1992 | Kehl et al. | 364/764 |
| 5,204,829 | 4/1993 | Luy et al. | 364/748 |
| 5,272,660 | 12/1993 | Rossbach | 364/748 |
| 5,309,383 | 5/1994 | Kuroiwa | 364/748 |

OTHER PUBLICATIONS

Milos D. Ercegovac and Tomas Lang, "Radix-4 Square Root Without Initial Pla," Computer Science Department, School of Engineering and Applied Science, University of California, LA, pp. 162-168, 1989 IEEE 9th Symposium On Computer Arithmetic.

Milos D. Ercegovac and Tomas Lang, "On-the-Fly Conversion of Redundant Into Conventional Representations," IEEE Transactions on Computers, vol. C-36, No. 7, Jul. 1987, pp. 895-897.

Milos D. Ercegovac and Tomas Lang, "On-the-fly Rounding for Division and Square Root," Computer Science Department, School of Engineering and Applied Science, University of California, LA, pp. 169-173.

Primary Examiner—Tan V. Mai

[57] ABSTRACT

An apparatus for performing floating-point division and square root computations according to an IEEE rounding standard includes input data alignment circuitry, core iteration circuitry, remainder compare circuitry, and round and select circuitry. The core iteration circuitry includes digit selector circuitry; remainder registers; quotient logic circuitry; remainder formation circuitry; and quotient registers for storing the quotient Q, incremented quotient Q+1, and decremented quotient Q−1. The remainder formation circuitry produces sum and carry bits of the $P_{j+1}$ term, which are in turn fed back to the partial remainder registers and used in subsequent iterations. The quotient logic circuitry builds the quotient Q and maintains the respective quotient Q, Q+1, Q−1 registers. The outputs of these registers are fed back to the quotient logic circuitry for use in subsequent iterations. The remainder compare circuitry comprises a remainder comparator and a logic circuit. The remainder comparator receives the sum and carry bits for the $P_{j+1}$ terms and outputs the "Sign" and "Zero" bits. These bits are received by the logic circuit along with a rounding mode signal, which is indicative of the selected rounding mode, e.g., shifted or normalized round to nearest, round to zero, or round to infinity. The logic circuit outputs a round select signal that selects a quotient select signal for selecting, as the final rounded quotient, the output of one of the quotient registers Q, Q+1, or Q−1. The round and select circuitry includes a round block for positive remainders and a round block for negative remainders.

15 Claims, 5 Drawing Sheets

METHODS AND APPARATUS FOR PERFORMING DIVISION AND SQUARE ROOT COMPUTATIONS IN A COMPUTER

FIELD OF THE INVENTION

The present invention relates generally to the field of floating point arithmetic, and more particularly relates to improved methods and apparatus for performing division and square root computations in a digital computer. One exemplary embodiment of the invention is directed to a method and apparatus for performing SRT division and square root computations in accordance with the rounding standard specified by IEEE Standard 754-1985.

BACKGROUND OF THE INVENTION

So called digit-by-digit division (or on-line division) is an iterative process that follows the formula:

$$P_{j+1} = rP_j - q_{j+1}D$$

$$Q_{j+1} = Q_j + r^{-(j+1)}q_{j+1},$$

where, $P_j$ represents the remainder at the j-th iteration, r represents the radix (e.g., r=10 for decimal digits, 2 for binary digits, and 4 for radix-4 digits), $q_{j+1}$ represents the next quotient digit, D represents the divisor, and $Q_j$ represents the quotient at the j-th iteration.

For example, the following manual computations obey the above formula for division:

```
              3.84    ←quotient
  divisor →9 ⌠34.57   ←rP₀(dividend)
              27
              7.57    ←rP₁
              7 2
                37    ←rP₂
                36
                 1    ←rP₃
```

In the above example, a person would immediately know what quotient digits to select in incrementally forming the quotient. That is, a person would select "3" as the first digit in the quotient, and then compute the second remainder $rP_1$ as $34.57 - 3 \times 9 = 7.57$; and then select "8" as the next quotient digit, and so on, to form the final quotient (3.84) to a desired degree of precision. However, a computer would determine the respective quotient digits by looking them up in a table of some sort or would employ "hard-wired" logic circuitry for determining the respective digits. In addition, computers represent numbers in a prescribed format, e.g., binary digits with one digit to the left of the binary point. A computer requires approximately $n/\log_2(n)$ iterations to compute an n-bit quotient using a digit-by-digit technique.

The two main classes of digit-by-digit division are restoring division, in which the remainders are always positive, and non-restoring division, in which the remainders may be positive or negative. Hand division is almost always performed with restoring division because the concept of negative remainders is foreign to most humans. However, computers typically perform non-restoring digit-by-digit division. The Sweeney, Robertson, Tocher (SRT) algorithm is one example of a known method for performing non-restoring digit-by-digit division in a computer.

For example, in the case of radix-4 arithmetic, the digit set $\{-3, -2, -1, 0, 1, 2, 3\}$ could be used to represent all possible quotients. However, it can be shown that the digit set $\{-2, -1, 0, 1, 2\}$ is sufficient to represent all possible quotients if negative remainders are employed. For example, the radix-2 number "10011100" is equivalent to the radix-4 number "2130" but is also equivalent to the signed-digit radix-4 number "22-10". That is, four borrowed from the second digit position in "22-10" (i.e., borrowed from the second 2) could be added to the third digit position (added to $-1$) to obtain "2130". Accordingly, the set $\{-2, -1, 0, 1, 2\}$ is referred to as the "minimally redundant" digit set for radix-4 arithmetic. Generally, the minimally redundant digit set for radix-r arithmetic is $\{-r/2, \ldots 0, \ldots r/2\}$.

FIG. 1 is a block diagram of conventional circuitry for performing radix-4 SRT division. As shown, a divider loop iteratively generates the $rP_j$ and $q_{j+1}$ terms while a quotient builder operates in parallel with the divider loop to assemble a quotient. The divider loop generates a series of radix-4 quotient digits (2, $-1$, 0, 1, 1, $-1$, 2), which are assembled by the quotient builder into the signed-digit radix-4 quotient "2.-101-12". The quotient builder (or another circuit element) then converts the radix-4 quotient into a conventional binary (positive digit) number.

It is well known that digital computers perform division and square root computations in accordance with similar formulas. For example, the above formula for digit-by-digit division is very similar to the following digit-by-digit square root formula:

$$P_{j+1} = rP_j - q_{j+1}(2Q_j) - q_{j+1}^2(r^{-(j+1)})$$

Therefore, although it is described herein in the context of methods and apparatus for performing binary floating point division, the present invention is also applicable to methods and apparatus for performing square root computations. (As described below, the present invention provides apparatus that computes both quotients and square roots with the same circuitry.)

In carrying out a division or square root operation in a digital computer, it is necessary to perform a rounding operation such that the final result can be represented in the computer. The IEEE Standard 754-1985 specifies a standard for performing binary floating point arithmetic. According to the IEEE standard, binary floating point numbers are formatted as:

$$1.x_2x_3x_4 \text{ --- } x_ny_1y_2y_3y_4\ldots$$

The leading "1" to the left of the binary point plus the binary digits (bits) "$x_2$" to "$x_n$" constitute the final n-digit number represented in the computer; "$x_n$" is the least significant bit (LSB); "$y_1$" is the "guard" bit; and the remaining bits to the right of the guard bit are ORed together to form a "sticky" bit.

The IEEE standard includes four alternative rounding modes, including: (1) round to zero (truncate to n bits); (2) round to positive infinity; (3) round to negative infinity; and (4) round to nearest even. The round to nearest mode, the most commonly employed, is described by the following code:

```
if guard = 0
    truncate to n bits
else (guard = 1)
    if sticky = 1
        round up
    else
        if LSB = 1
            round up
        else
            truncate
endif
```

FIG. 2 schematically depicts the conventional IEEE rounding process for non-restoring division. The process includes the following steps: Forming an n-bit quotient plus two additional bits, a guard bit (G) and an extra bit (R); decrementing the quotient if the remainder is less than zero; normalizing the quotient by shifting all bits to the left one position if the most significant bit (MSB) is zero, resulting in a normalized quotient with a guard bit; inputting the extra bit R and the guard bit G to a rounding logic block that conditionally increments the quotient in accordance with the selected rounding mode; renormalizing the quotient by shifting all bits to the right if the increment causes an overflow; and storing the final mantissa of the quotient. It should be noted that the bit R is used in cases where the quotient is to be shifted left. In these cases, G becomes R. Otherwise, R is ORed into the sticky bit.

There are a number of problems with the conventional rounding process summarized above. For example, since the remainder is in the carry save form (see M. Ercegovak and T. Lang, "On-the-fly Rounding for Division and Square Root," fully cited below, for a description of carry save addition), determining whether the remainder is zero or less than zero requires $\log_2 n$ gate delays. In addition, the decrement and the increment each require $\log_2 n$ delays. Further, the round logic is in the critical path, causing further delay.

M. Ercegovak and T. Lang, in "On-the-fly Rounding for Division and Square Root," IEEE Transactions on Computers, Vol. C-36, No. 7, July 1987, pp. 895–897, hereby incorporated by reference into the present specification, disclose a method for converting signed digits of a quotient to conventional (unsigned) digits such that the result will be rounded. The conversion/rounding process is said to be performed "on-the-fly" and is purportedly faster than conventional operations because it does not employ carry-propagate addition.

Referring to FIG. 3, the Ercegovak-Lang method (hereinafter referred to as the "Ercegovak method") essentially involves maintaining three quotient registers Q+1, Q, Q−1, respectively containing the quotients Q+1, Q, and Q−1, and selecting the correct quotient via a multiplexor. A selection control signal is generated by a rounding block that employs a "remainder sign" bit (which is "1" if the partial remainder is negative and "0" otherwise), a "remainder=0" bit (which is "1" if the partial remainder is zero and "0" otherwise), and the last quotient digit ($q_{n+1}$) as inputs. The content of each quotient register is set in accordance with the following algorithm:

```
left shift Q, Q−1 by two bits
if digit = 2
    Q = (Q) + "10"
    Q−1 = (Q) + "01"
    Q+1 = (Q) + "11"
```

```
-continued
if digit = 1
    Q = (Q) + "01"
    Q−1 = (Q) + "00"
    Q+1 = (Q) + "10"

if digit = 0
    Q = (Q) + "00"
    Q−1 = (Q−1) + "11"
    Q+1 = (Q) + "01"

if digit = −1
    Q = (Q−1) + "11"
    Q−1 = (Q−1) + "10"
    Q+1 = (Q) + "00"

if digit = −2
    Q = (Q−1) + "10"
    Q−1 = (Q−1) + "01"
    Q+1 = (Q−1) + "11"

end
```

The above rounding algorithm is summarized in the rounding table below, which shows the selected quotient for the minimally redundant radix-4 digit set and for positive and negative remainders. This table is for the round to nearest mode, which is the only rounding mode discussed in the above-cited paper.

| Ercegovak Rounding Table | | |
|---|---|---|
| last digit | remainder sign | round to nearest Q select |
| +2 | + | Q+1 |
| +1 | + | Q |
| 0 | + | Q |
| −1 | + | Q |
| −2 | + | Q |
| +2 | − | Q |
| +1 | − | Q |
| 0 | − | Q |
| −1 | − | Q |
| −2 | − | Q−1 |

In sum, the rounding process for IEEE division and square root computations is typically very costly since, to properly generate the sticky and guard bits, it requires detecting the sign of the partial remainder and comparing the partial remainder to zero. This operation is then followed by a post-increment or post-decrement of the quotient to properly generate the final result. Ercegovak discloses a method involving pre-computing the possible quotient values and replacing the increment/decrement step with a selection step. However, there are disadvantages in using the Ercegovak rounding method. For example, the cited paper lacks disclosure of how the algorithm can be modified to cover rounding modes other than the round to nearest mode. Moreover, the disclosed method appears not to handle formats with an unnormalized mantissa (i.e., where Q is outside the range $\frac{1}{2} \leq Q < 2$), nor does it deal with complications caused by employing different number formats, such as IEEE single precision (23 bits) versus IEEE double precision (52 bits). Further, the method assumes the sticky bit is set, which may not be true in all cases.

SUMMARY OF THE INVENTION

Accordingly, a primary goal of the present invention is to provide improved apparatus for carrying out division and square root computations. In particular, a goal of the present invention is to improve upon Ercegovak's rounding process by decreasing the complexity of the critical path such that the total delay introduced by the rounding process will be approximately the same as that introduced by the remainder compare plus a few additional gate delays. In other words, the goal is to reduce the number of delays from about $3\log_2 n + K_1$ to $\log_2 n + K_2$, where $K_1$ and $K_2$ are constants. In addition, a goal of the present invention is to provide division apparatus that may be used for all three IEEE rounding modes. Moreover, a goal of the present invention is to provide division apparatus that can handle cases where the quotient is in the range $\frac{1}{4} \leq Q < \frac{1}{2}$.

The present invention achieves the above goals by providing apparatus for performing floating-point digit-by-digit division in a computer. According to the invention, such apparatus comprise: input data alignment means for aligning a dividend operand and a divisor operand to place the operands in a prescribed format; digit selector logic for selecting quotient digits $q_{j+1}$ to be used in iteratively constructing a quotient Q; remainder formation logic for generating a division partial remainder $P_{j+1}$ in accordance with the formula $P_{j+1} = rP_j - q_{j+1}D$; quotient logic for iteratively constructing the quotient Q in accordance with the formula $Q_{j+1} = Q_j + r^{-(j+1)} q_{j+1}$, and for decrementing and incrementing the quotient Q to obtain a decremented quotient $Q-1$ and an incremented quotient $Q+1$; a Q register for storing the quotient Q, a QM register for storing the decremented quotient $Q-1$, and a QP register for storing the incremented quotient $Q+1$; remainder compare logic for receiving a rounding mode signal indicative of a selected one of a plurality of prescribed rounding modes, determining whether the partial remainder $P_{j+1}$ is zero and whether the partial remainder is less than zero, and outputting a round select signal; and round and select logic for selecting, as a final rounded quotient, one of Q, $Q-1$, and $Q+1$ on the basis of the last quotient digit $q_{j+1}$ and the round select signal.

In preferred embodiments of the present invention, the round and select logic comprises a round block for positive remainders and a round block for negative remainders. The round blocks each produce a quotient select signal and the round select signal selects one of the quotient select signals for use in selecting the final rounded quotient from the Q, QM, and QP registers.

In addition, in preferred embodiments the remainder formation logic also generates a square root partial remainder $P'_{j+1}$ in accordance with the following formula for square root calculations:

$$P'_{j+1} = rP'_j - q_{j+1}(2Q_j) - q_{j+1}^2(r^{-(j+1)}).$$

The remainder formation logic comprises means for selecting which of the division partial remainder and square root partial remainder is generated. Furthermore, in the specific embodiment of the invention disclosed herein, the remainder formation logic comprises: a partial remainder register storing a current division partial remainder $P_j$ or current square root partial remainder $P'_j$; a first walking one shift register selectively outputting a $q^2_{j+1} r^{-(j+1)}$ term; a carry save subtract circuit operatively coupled to the first walking one shift register and to the partial remainder register, the carry save subtract circuit receiving the quantity $rP_j$ from the partial remainder register, receiving one of $q^2_{j+1} r^{-(j+1)}$ output by the first walking one shift register or zero, and outputting $rP_j$ or $rP'_j - q^2_{j+1} r^{-(j+1)}$; a second walking one shift register selectively outputting $q_{j+1}D$ or $q_{j+1}(2Q_j)$; and a carry save add/subtract circuit receiving the output of the carry save subtract circuit, receiving the output of the second walking one shift register, and outputting a next division partial remainder $rP_{j+1}$ or a next square root partial remainder $rP'_{j+1}$ for storage in the partial remainder register.

In addition, in preferred embodiments, the input data alignment means aligns the input operands such that the computed result is in one of the following formats:

IEEE Single Precision (23 bits + leading 1)
  00.1xxx------xL Gx "Normalized"
  00.01xxx------x LG "Shift"
    - MSB position IEEE Double Precision (52 bits + leading 1)
  01.xxx--------------------xL Gx "Normalized"
  00.1xxx--------------------x LG "Shift"
    - MSB position The prescribed rounding modes preferably include an IEEE round to nearest mode, an IEEE round to zero mode, and an IEEE round to infinity mode.

The present invention offers a number of important advantages over the prior art. For example, the invention provides a means for performing division and square root calculations with the same circuitry. In addition, the present invention provides circuitry that can perform both single and double precision calculations. Moreover, the inventive circuitry presents very little delay over that which is required by just the remainder compare. Furthermore, the present invention allows the result to be shifted one digit to the left and still be a correct result.

DETAILED DESCRIPTION OF PREFERRED EMBODIMENTS

Figure 1:
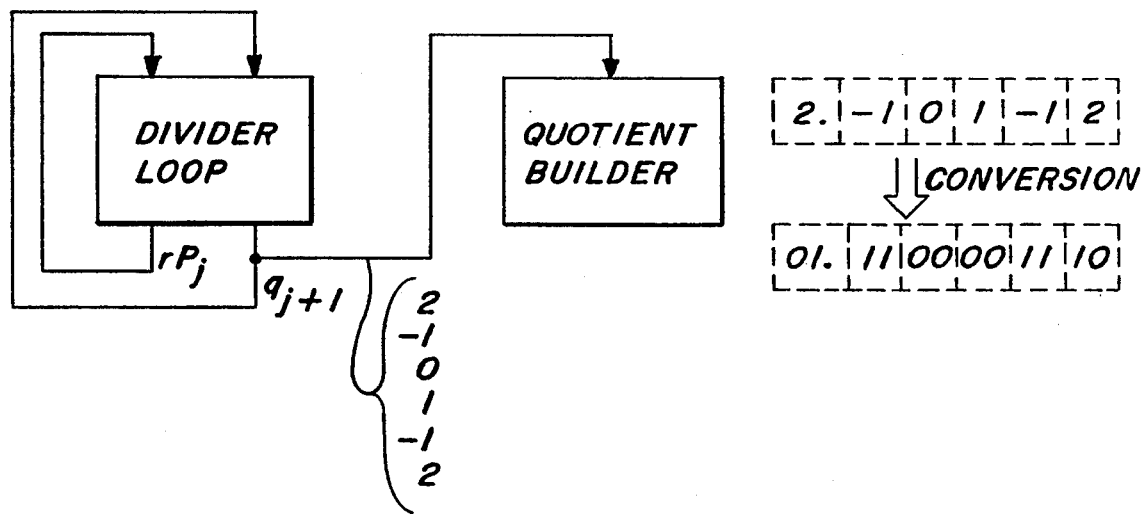
FIG. 1 is a block diagram of a conventional circuit for performing radix-4 SRT division.

As described in detail below, preferred embodiments of the present invention may be developed as follows. First, the Ercegovak on-the-fly rounding method is expanded to handle cases where a pre-shift of the quotient would be required to put the leading one in its proper position (i.e., such that $\frac{1}{4} \leq Q < 1$). The Ercegovak quotient selection table is then expanded to include all IEEE rounding modes, i.e., round to zero, round to infinity, and round to nearest. The quotient selection table is then reduced by eliminating cases that are impossible for division and square root. The quotient selection table is then further reduced by mapping all cases into two parallel selection units. A simplified rounding method employing the further reduced selection table is then provided.

Thus, preferred embodiments of the present invention stem from the following "expanded rounding table," which includes additional rounding modes (round to zero and round to infinity) and, for each mode, an additional shifted rounding mode. In addition, the new table is divided into regions where the remainder is positive, zero, and negative.

present inventor has developed a "simplified rounding table," set out below, which takes advantage of the following characteristics of division and square root computations:

(1) Exact divides will always select zero as the last digit, such that the guard, remainder, and sign bits will be zero. This is based on the provable fact that, if the result divides exactly (i.e., when the partial remainder $P_{n+1}=0$ at the n+1 iteration), the only correct quotient digit ($q_{n+1}$) to select is zero.

(2) The remainder equal to zero case can be mapped to other cases in the table, leading to two rounding units, one for the case where the remainder is positive and one for the case where the remainder is negative.

| | | | EXPANDED ROUNDING TABLE | | | | | |
|---|---|---|---|---|---|---|---|---|
| Last | Remainder | | Round to Nearest | | Round to Zero | | Round to Infinity | |
| Digit | Sign | Zero | Normalized | Shift | Normalized | Shift | Normalized | Shift |
| +2 | 0 | 0 | QP | Q,1 | Q | Q,1 | QP | QP,1 |
| +1 | 0 | 0 | Q | Q,1 | Q | Q,0 | QP | Q,1 |
| 0 | 0 | 0 | Q | Q,0 | Q | Q,0 | QP | Q,1 |
| −1 | 0 | 0 | Q | Q,0 | QM | QM,1 | Q | Q,0 |
| −2 | 0 | 0 | Q | QM,1 | QM | QM,1 | Q | Q,0 |
| +2 | 0 | 1 | if LSB$_Q$-QP else Q | Q,1 | Q | Q,1 | QP | Q,1 |
| +1 | 0 | 1 | Q | Q,0 | Q | Q,0 | Q | Q,1 |
| 0 | 0 | 1 | Q | Q,0 | Q | Q,0 | Q | Q,0 |
| −1 | 0 | 1 | Q | Q,0 | QM | QM,1 | Q | Q,0 |
| −2 | 0 | 1 | if LSB$_{QM}$-Q else QM | QM,1 | QM | QM,1 | Q | Q,0 |
| +2 | 1 | 0 | Q | Q,1 | Q | Q,0 | QP | Q,1 |
| +1 | 1 | 0 | Q | Q,0 | Q | Q,0 | QP | Q,1 |
| 0 | 1 | 0 | Q | Q,0 | QM | QM,1 | Q | Q,0 |
| −1 | 1 | 0 | Q | QM,1 | QM | QM,1 | Q | Q,0 |
| −2 | 1 | 0 | QM | QM,1 | QM | QM,0 | Q | QM,1 |

In the above table, "QM" and "QP" respectively represent "Q−1" and "Q+1". The notation Q,1, QM,1, or QP,1 refers to the shifted version of the quotient Q, QM, or QP, respectively.

The present invention is intended to reduce the so-called "critical path" or, in other words, to reduce the total delay from the arrival of the final inputs to the generation of the quotient select and LSB signals; to move the remainder compare outputs to late in the critical path; and to take advantage of the early arrival of the digit and quotient information. With respect to the above table, the present invention reduces complexity by eliminating impossible cases. The present invention also removes the sign and zero remainder from the logic and replaces them with a select function. The To employ the following simplified rounding table, the rounding method must insure that the digit k will be selected when $p_j=kD$.

| | | | SIMPLIFIED ROUNDING TABLE | | | | | |
|---|---|---|---|---|---|---|---|---|
| Last | Remainder | | Round to Nearest | | Round to Zero | | Round to Infinity | |
| Digit | Sign | Zero | Normalized | Shift | Normalized | Shift | Normalized | Shift |
| +2 | 0 | 0 | QP | Q,1 | Q | Q,1 | QP | QP,1 |
| +1 | 0 | 0 | Q | Q,1 | Q | Q,0 | QP | Q,1 |
| 0 | 0 | 0 | Q | Q,0 | Q | Q,0 | QP | Q,1 |
| −1 | 0 | 0 | Q | Q,0 | QM | QM,1 | Q | Q,0 |
| −2 | 0 | 0 | Q | QM,1 | QM | QM,1 | Q | Q,0 |
| 0 | 0 | 1 | Q | Q,0 | Q | Q,0 | Q | Q,0 |
| +2 | 1 | 0 | Q | Q,1 | Q | Q,0 | QP | Q,1 |
| +1 | 1 | 0 | Q | Q,0 | Q | Q,0 | QP | Q,1 |
| 0 | 1 | 0 | Q | Q,0 | QM | QM,1 | Q | Q,0 |
| −1 | 1 | 0 | Q | QM,1 | QM | QM,1 | Q | Q,0 |
| −2 | 1 | 0 | QM | QM,1 | QM | QM,0 | Q | QM,1 |

The Last Digit=0, Sign=0, Zero=1 cases in the center of the table may be mapped to the positive remainder ("Sign=0") and negative remainder ("Sign=1") cases. This center portion of the table may therefore be eliminated, as shown in the following "further simplified rounding table."

| | | | FURTHER SIMPLIFIED ROUNDING TABLE | | | | | |
|---|---|---|---|---|---|---|---|---|
| Last | Remainder | | Round to Nearest | | Round to Zero | | Round to Infinity | |
| Digit | Sign | Zero | Normalized | Shift | Normalized | Shift | Normalized | Shift |
| +2 | 0 | 0 | QP | Q,1 | Q | Q,1 | QP | QP,1 |
| +1 | 0 | 0 | Q | Q,1 | Q | Q,0 | QP | Q,1 |
| 0 | 0 | 0 | Q | Q,0 | Q | Q,0 | QP | Q,1 |
| −1 | 0 | 0 | Q | Q,0 | QM | QM,1 | Q | Q,0 |

-continued

FURTHER SIMPLIFIED ROUNDING TABLE

| Last Digit | Remainder Sign | Remainder Zero | Round to Nearest Normalized | Round to Nearest Shift | Round to Zero Normalized | Round to Zero Shift | Round to Infinity Normalized | Round to Infinity Shift |
|---|---|---|---|---|---|---|---|---|
| −2 | 0 | 0 | Q  | QM,1 | QM | QM,1 | Q  | Q,0  |
| +2 | 1 | 0 | Q  | Q,1  | Q  | Q,0  | QP | Q,1  |
| +1 | 1 | 0 | Q  | Q,0  | Q  | Q,0  | QP | Q,1  |
|  0 | 1 | 0 | Q  | Q,0  | QM | QM,1 | Q  | Q,0  |
| −1 | 1 | 0 | Q  | QM,1 | QM | QM,1 | Q  | Q,0  |
| −2 | 1 | 0 | QM | QM,1 | QM | QM,0 | Q  | QM,1 |

Figure 3:
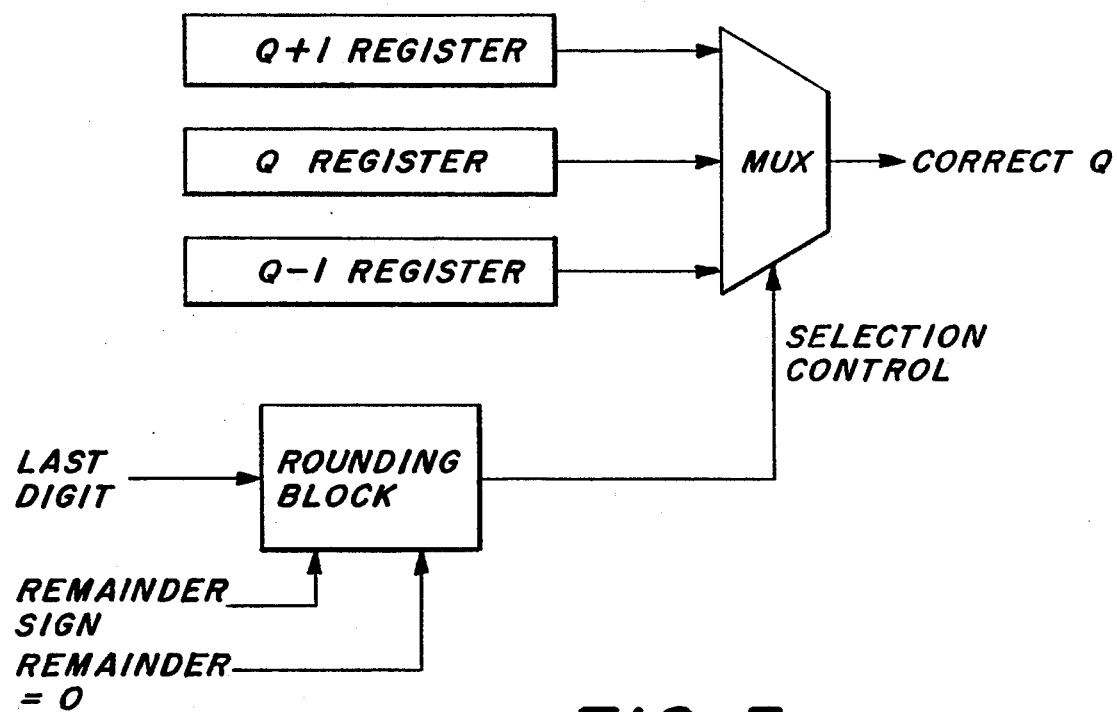
FIG. 3 is a block diagram representing the Ercegovak rounding method.
Figure 2:
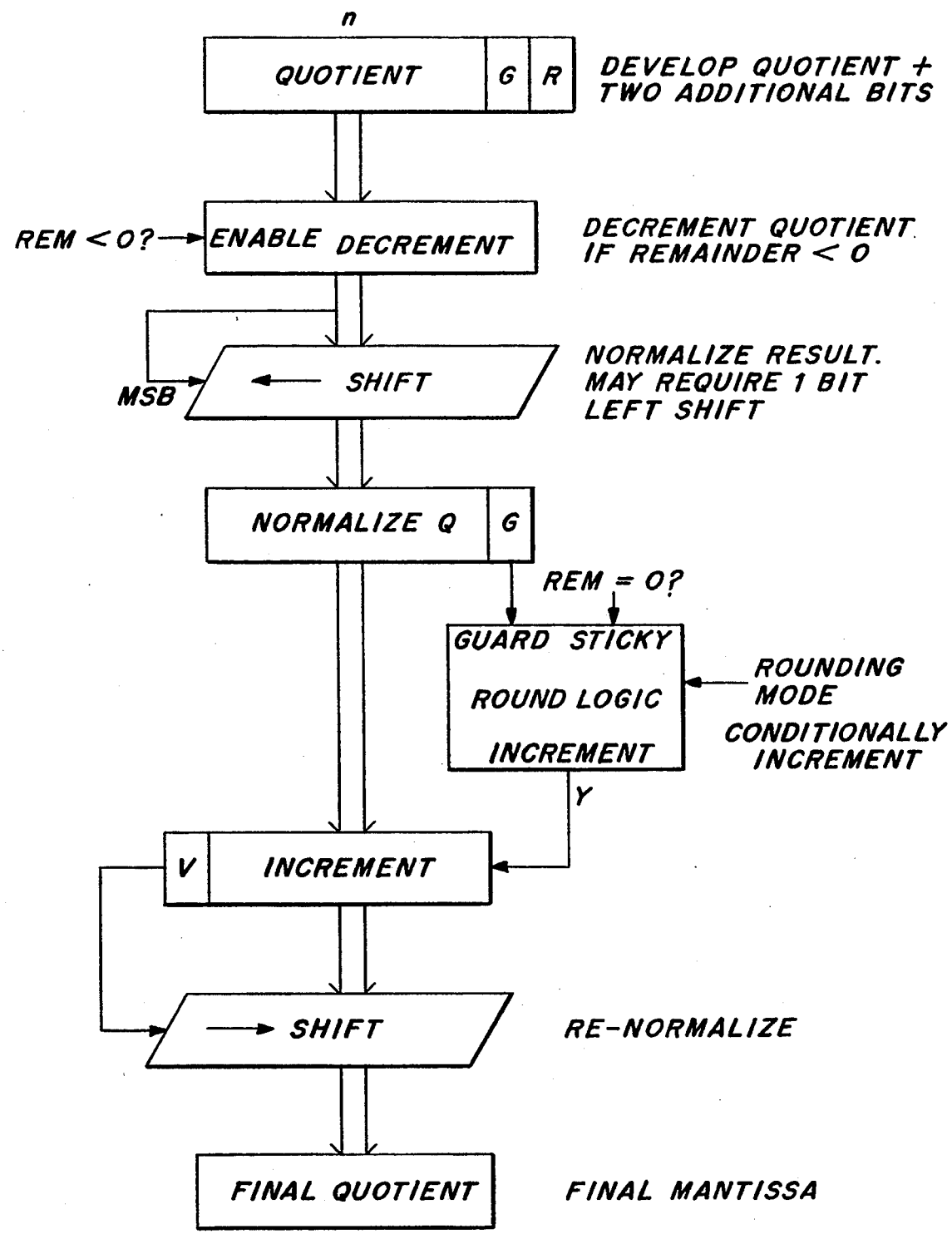
FIG. 2 is a schematic depiction of a prior art IEEE rounding process.

Therefore, the complex rounding block (FIG. 3) employed by the Ercegovak method may be replaced by two simpler rounding blocks, one for positive remainders and one for negative remainders.

The format of the final quotient and digit should be as follows:

```
1.xxx------xL Gx, or
0.xxx------xx LG.
  --quotient--/   -final digit
```

The format of the final quotient should have the following properties:

1. The IEEE correct answer should be one of the values in the Q, Q−1, or Q+1 registers, or it should be obtainable from one of these values with a single one bit left shift and LSB append operation.
2. The number of iterations should not vary if a left shift is required.
3. The radix point should fall on a digit boundary.

This leads to the following quotient alignment:

```
IEEE Single Precision (23 bits + leading 1)
    00.1xxx------xL Gx  "Normalized"
    00.01xxx-----x  LG  "Shift"
      − MSB        −1d0
                   +---1d1

IEEE Double Precision (52 bits + leading 1)
    01.xxx------------------xL Gx  "Normalized"
    00.1xxx-----------------x  LG  "Shift"
      − MSB position        −1d0
                            +---1d1
```

To employ the rounding method of the present invention, the input data must be pre-aligned to produce a result in one of the above formats.

Figure 4:
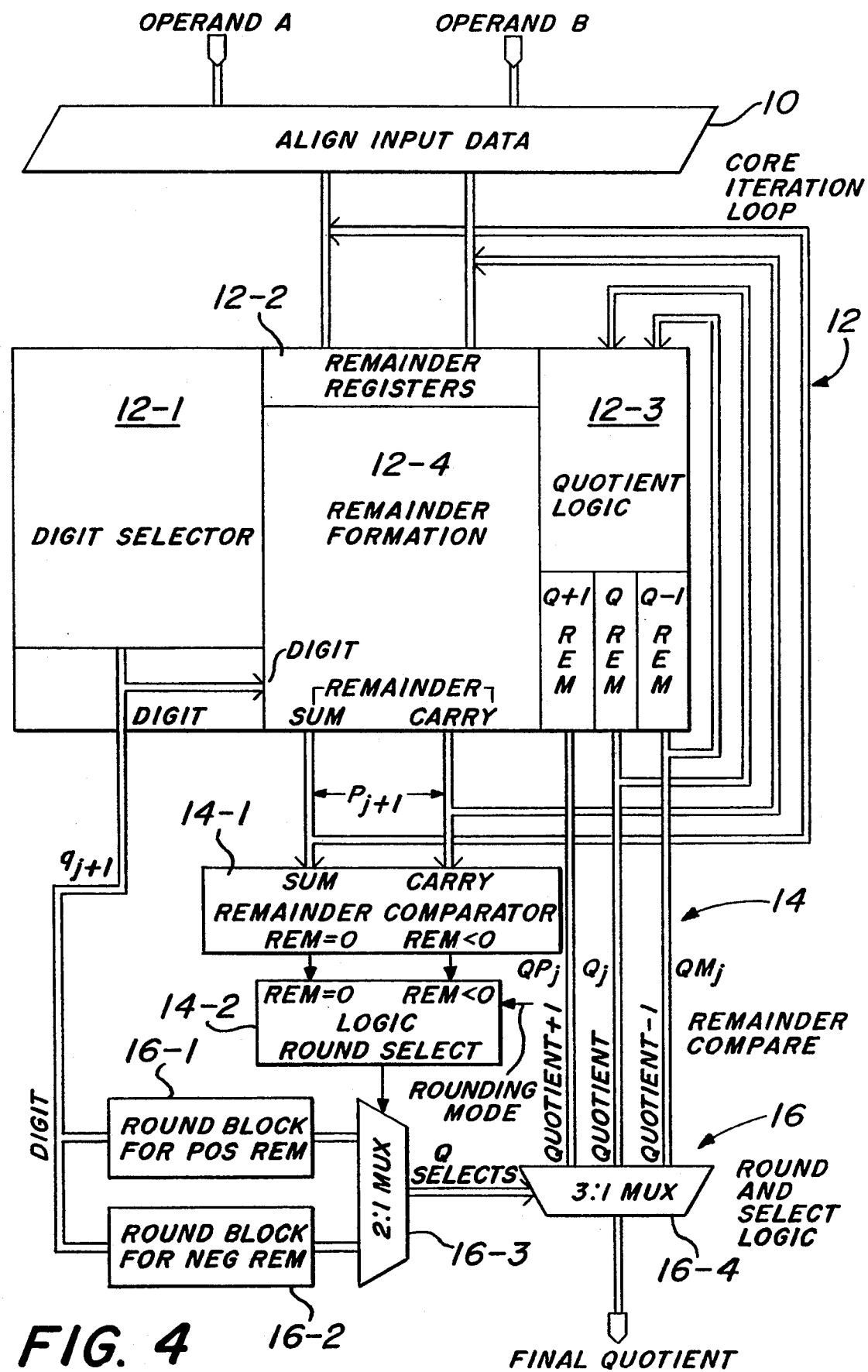
FIG. 4 is a block diagram of one preferred embodiment of an apparatus in accordance with the present invention for performing floating-point division and square root computations according to the IEEE rounding standard.

FIG. 4 is a block diagram of one preferred embodiment of the present invention. The preferred embodiment includes input data alignment circuitry 10, core iteration circuitry 12, remainder compare circuitry 14, and round and select circuitry 16.

The input data alignment circuitry 10 aligns the input operands (denoted "A" and "B") as described above. The core iteration circuitry 12 includes digit selector circuitry 12-1; remainder registers 12-2; quotient logic circuitry 12-3; remainder formation circuitry 12-4; and quotient registers for storing the quotient Q, incremented quotient Q+1, and decremented quotient Q−1 (these registers are also referred to herein as "Q", "QP", and "QM", respectively).

The digit selector circuitry selects the next quotient digits $q_{j+1}$ in a manner known from the prior art, i.e., by selecting a particular quotient digit on the basis of the partial remainder ($rP_j$) and either the divisor (D) in a division or partial root ($2Q_j$) in a square root calculation. The quotient digits may be selected with fixed logic circuitry or from a memorized table (e.g., having columns corresponding to divisors or partial roots and rows corresponding to partial remainders).

The remainder formation circuitry 12-4 produces sum and carry bits of the $P_{j+}$ term, which are in turn fed back to the partial remainder registers 12-2 and used in subsequent iterations. The remainder formation circuitry 12-4 is described in greater detail below with reference to FIG. 5.

The quotient logic circuitry 12-3 builds the quotient Q and maintains the respective quotient Q, Q+1, Q−1 registers. The outputs of these registers are fed back to the quotient logic circuitry for use in subsequent iterations. Further details of the quotient logic circuitry 12-3 are described below with reference to FIG. 6.

The remainder compare circuitry 14 comprises a remainder comparator 14-1 and a logic circuit 14-2. The remainder comparator 14-1 receives the sum and carry bits for the $P_{j+1}$ terms and outputs the "Sign" and "Zero" bits (i.e., remainder=0, remainder<0) referred to in the above simplified rounding tables. These bits are received by the logic circuit 14-2 along with a rounding mode signal, which is indicative of the selected rounding mode, e.g., shifted or normalized round to nearest, round to zero, or round to infinity. The logic circuit 14-2 outputs a round select signal that selects a quotient select signal for selecting, as the final rounded quotient, the output of one of the quotient registers Q, Q+1, or Q−1.

The logic of the round selection block 14-2 is represented by the following code:
if remainder <0 or (remainder=0 and rounding mode=Round to Infinity) then
  use negative rounding block outputs else
  use positive rounding block outputs The round and select circuitry 16 includes a round block for positive remainders 16-1, a round block for negative remainders 16-2, a first multiplexor 16-3, and a second multiplexor 16-4. The round blocks 16-1 and 16-2 receive the selected quotient digit $q_{j+1}$ from the digit selector circuitry 12-1 and generate quotient select signals for positive and negative partial remainder values, respectively. The quotient select signals are input to the first multiplexor 16-3, which outputs a selected one of these signals in accordance with the round select signal provided by the remainder compare logic circuit 14-2. The quotient select signal output by multiplexor 16-3 is used by the second multiplexor 16-4 to select one of Q, Q+1, or Q−1 as the final rounded quotient.

The details of the round blocks 16-1 and 16-2 can best be described by pseudo code representing their functionality:

Description of round block for negative remainder (Block 16-2): if last digit >= 0
{
  if digit = 0

-continued
```
        then source register = Q−1
    else source register = Q
    if MSB of Q is set
        then use "Normalized" rounding */
        else use "Shifted" rounding
} else /* last digit < 0 */
{
    source register = Q−1
    if MSB of Q−1 is set
        then use "Normalized" rounding */
        else use "Shifted" rounding */
} if "Normalized" rounding
{
    Guard = bit ld1 of last digit from Q−1 append logic
    NewLSB = 0
} else /* "Shifted" rounding */
{
    Guard = bit ld0 of last digit from Q−1 append logic
    NewLSB = bit ld1 of last digit from Q−1 append logic
}

/* "Round to Inifinity" is used if in IEEE round to infinity mode
/* and sign of infinity mode matches sign of result,
else use                            */
/* "Round to Zero mode            */
/* always assume sticky = 1 */
case (rounding mode) of
    Round to Zero:
        /* don't increment     */
        Quotient Select = source register
    Round to Infinity
        /* increment */
        Quotient Select = next higher register from source
        New LSB = ~NewLSB
    Round to Nearest
        if Guard is set
            then
                Quotient Select = next higher register from source
                NewLSB = ~NewLSB
            else
                Quotient Select = source register
Description of round block for positive remainder (Block 16-1): if last digit >= 0
{
    source register = Q
    if MSC of Q is set
        then use "Normalized" rounding */
        else use "Shifted" rounding
} else /* last digit < 0 */
{
    source register = Q−1
    if MSB of Q−1 is set
        then use "Normalized" rounding */
        else use "Shifted" rounding */
} if "Normalized" rounding
{
    Guard = bit ld1 of last digit from Q append logic
    NewLSB = 0
} else /* "Shifted" rounding */
{
    Guard = bit ld0 of last digit from Q append logic
    NewLSB = bit ld1 of last digit from Q append logic
}

/* "Round to Infinity" is used if in IEEE round to infinity mode */
/* and sign of infinity mode matches sign of result,
else use */
/* "Round to Zero" mode  */
/* always assume sticky = 1 */
case (rounding mode) of
    Round to Zero:
        /* don't increment */
        Quotient Select = source register
    Round to Infinity
        /* increment */
        Quotient Select = next higher register from source
        NewLSB = ~NewLSB
    Round to Nearest
        of Buard is set
            then
                Quotient Select = next higher register from source
                NewLSB = ~NewLSB
            else
                Quotient Select = source register
Round Selection block operation (Block 14-2)
if remainder <0 or (remainder = 0 and rounding mode = Round to inifinity)
    then
        use negative rounding block outputs
    else
        use positive rounding block outputs
```

Figure 5:
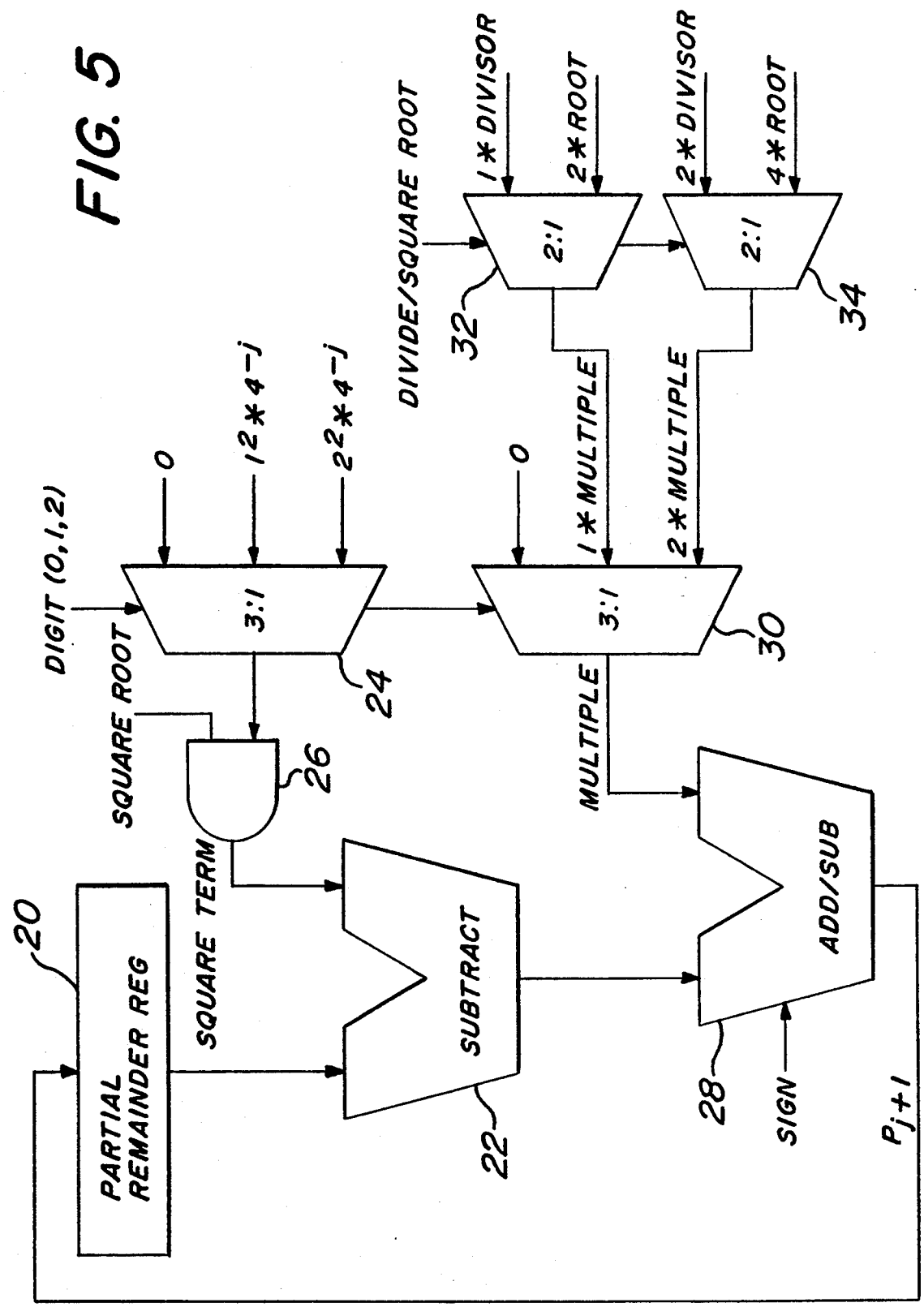
FIG. 5 is a schematic diagram of remainder formation circuitry for use in the remainder formation block 12-4 of the FIG. 4 apparatus.

FIG. 5 is a schematic diagram of one preferred embodiment of remainder formation circuitry for use in the remainder formation block 12-4 of the FIG. 4 apparatus. This circuitry is for radix-4 arithmetic but may be adapted for other number systems. It includes a partial remainder register 20, a carry save subtract circuit 22, a first three-to-one "walking one" shift register 24, an AND gate 26, a carry save add/subtract circuit 28, a second three-to-one walking one shift register 30, and a pair of two-to-one walking one shift registers 32, 34. The operation of the remainder formation circuitry will be apparent to those skilled in the art. However, the following description is provided for completeness.

At the start of an iteration, e.g., the j+1th iteration, the partial remainder register 20 will contain a division partial remainder $rP_j$ or a square root partial remainder $rP'_j$. The output of the AND gate 26 will be either zero or the quantity $q^2_{j+1}(r^{-(j+1)})$, which is the squared term for square root computations. The square root output is provided when a "Square Root" signal input to the second input terminal of the AND gate is high ("1"); otherwise, the AND gate output will be zero. The $q^2_{j+1}(r^{-(j+1)})$ term is generated by the first walking one shift register 24, which receives the quotient digit $q^2_{j+1}$ (e.g., either 0, 1, or 2) from the digit selector logic 12-3 (FIG. 4) and shifts this digit in accordance with an input 0, $1^{2}*4^{-j}$, or $2^{2}*4^{-j}$. Therefore, the carry save subtract circuit 22 will output either $rP_j$ or $rP'_j - q^2_{j+1}r^{-(j+1)}$, depending on whether the Square Root signal is high or low. The second walking one shift register 30 receives the quotient digit $q^2_{j+1}$ (0, 1, or 2) from the first walking one shift register 24 and outputs $q_{j+1}D$ or $q_{j+1}(2Q_j)$ (the former for division and the latter for square root computations), where D represents the divisor and $Q_j$ represents the partial root. Therefore, the carry save add/subtract circuit 28 receives the quantity $rP_j$ or $rP'_j - q^2_{j+1}r^{-(j+1)}$ at one input and the quantity $q_{j+1}D$ or $q_{j+1}(2Q_j)$ at another input. Accordingly, the output of the carry save add/subtract circuit 28, which is fed back to the partial remainder register 20, will be either the division partial remainder $P_{j+1} = rP_j - q_{j+1}D$ or the square root partial remainder $P'_{j+1} = rP'_j - q_{j+1}(2Q_j) - q_{j+1}^2(r^{-(j+1)})$.

Figure 6:
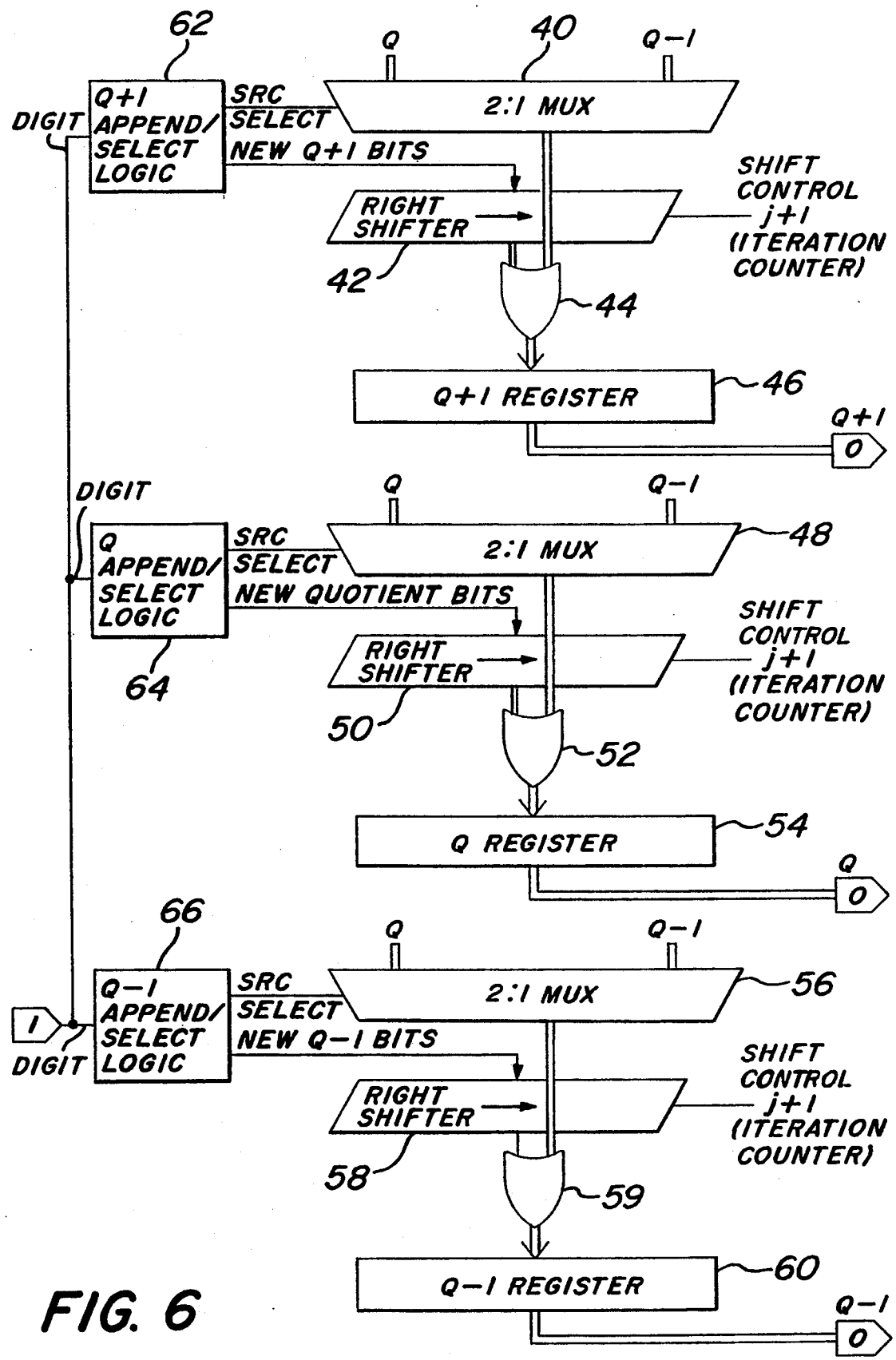
FIG. 6 is a schematic diagram of quotient logic circuitry for use in the quotient generation block 12-3.

FIG. 6 schematically depicts the quotient generation circuitry, which is represented by blocks 12-3 in FIG. 4. As shown, the circuitry includes a 2:1 mux 40, a write shifter 42, an OR gate 44, a Q+1 register 46, another 2:1 mux 48, another write shifter 50, another OR gate 52, a Q register 54, another 2:1 mux 56, another write shifter 58, another OR gate 59, a Q−1 register 60, a Q+1 append/select logic block 62, a Q append/select logic block 64, and a Q−1 append/select logic block 66. The operation of this circuitry will be apparent to those skilled in the art, particularly in view of the foregoing description of the quotient generation operation. Accordingly, this circuitry will not be described further.

The above description of preferred embodiments is not intended to impliedly limit the scope of protection of the following claims. Thus, for example, unless they are expressly so limited, the following claims are not limited to apparatus for performing radix-4 arithmetic or to the specific IEEE rounding modes discussed above.

I claim:

1. An apparatus for performing floating-point digit-by-digit division in a computer, comprising:
   (a) input data alignment means for aligning a dividend operand and a divisor operand to place said operands in a prescribed format;
   (b) digit selector logic for selecting quotient digits $q_{j+1}$ to be used in iteratively constructing a quotient Q;
   (c) remainder formation logic for generating a division partial remainder $P_{j+1}$ in accordance with the following formula for division:

$$P_{j+1} = rP_j - q_{j+1}D,$$

where "j" is an index representing iterations employed in constructing said quotient, "$P_j$" represents the remainder at the j-th iteration, "r" represents the radix of the number system employed to represent numbers in the computer, and "D" represents the divisor;
   (d) quotient logic for iteratively constructing said quotient Q in accordance with the formula $$Q_{j+1} = Q_j + r^{-(j+1)} q_{j+1},$$

where "$Q_j$" represents the quotient Q at the j-th iteration and for decrementing and incrementing said quotient Q to obtain a decremented quotient Q−1 and an incremented quotient Q+1;
   (e) a Q register for storing the quotient Q, a QM register for storing the decremented quotient Q−1, and a QP register for storing the incremented quotient Q+1;
   (f) remainder compare logic for receiving a rounding mode signal indicative of a selected one of a plurality of prescribed rounding modes, determining whether said partial remainder $P_{j+1}$ is zero and whether said partial remainder is less than zero, and outputting a round select signal; and
   (g) round and select logic for selecting, as a final rounded quotient, one of Q, Q−1, and Q+1 on the basis of the last quotient digit $q_{j+1}$ and said round select signal.

2. Apparatus as recited in claim 1, wherein said round and select logic comprises a round block for positive remainders and a round block for negative remainders, wherein said round blocks each produce a quotient select signal, and said round select signal selects one of said quotient select signals to employ in selecting the final rounded quotient from said Q, QM, and QP registers.

3. Apparatus as recited in claim 1, wherein said remainder formation logic further generates a square root partial remainder $P'_{j+1}$ in accordance with the following formula for square root calculations:

$$P'_{j+1} = rP'_j - q_{j+1}(2Q_j) - q_{j+1}^2(r^{-(j+1)}),$$

wherein the remainder formation logic comprises means for selecting which of said division partial remainder and square root partial remainder is generated.

4. Apparatus as recited in claim 3, wherein said remainder formation logic further comprises:
   a partial remainder register storing a current division partial remainder $P_j$ or current square root partial remainder $P'_j$;
   a first walking one shift register selectively outputting a $q^2_{j+1} r^{-(j+1)}$ term;
   a carry save subtract circuit operatively coupled to said first walking one shift register and to said partial remainder register, said carry save subtract circuit receiving the quantity $rP_j$ from said partial remainder register, receiving one of $q^2_{j+1} r^{-(j+1)}$ output by said first walking one shift register or zero, and outputting $rP_j$ or $rP'_j - q^2_{j+1} r^{-(j+1)}$;
   a second multiplexer circuit selectively outputting $q_{j+1}D$ or $q_{j+1}(2Q_j)$; and
   a carry save add/subtract circuit receiving the output of said carry save subtract circuit, receiving the output of said second multiplexer circuit, and outputting a next division partial remainder $rP_{j+1}$ or a next square root partial remainder $rP'_{j+1}$ for storage in said partial remainder register.

5. Apparatus as recited in claim 1, wherein said prescribed format comprises one of the following formats:

Single Precision
   00.1xxx-----xL Gx "Normalized"
   00.01xxx-----x LG "Shift"

Double Precision
   01.xxx------------------------xL Gx "Normalized"
   00.1xxx------------------------x LG "Shift"

wherein "x" represents a 0 or 1, "L" represents a least significant bit (LSB), and "G" represents a guard bit.

6. Apparatus as recited in claim 1, wherein said prescribed rounding modes include an IEEE round to nearest mode, an IEEE round to zero mode, and an IEEE round to infinity mode.

7. Apparatus as recited in claim 6, wherein said remainder compare logic and said round and select logic effect the selection of said final quotient in accordance with the following table, wherein QP and QM respectively represent Q+1 and Q−1, and the legends "Q,1", "QM,1", and "QP,1" represent the contents of said Q, QM, and QP registers, respectively, shifted to the left by one digit position, and "Q,0" represents the unshifted contents of said Q register:

| Last Digit | Remainder Sign | Remainder Zero | Round to Nearest Normalized | Round to Nearest Shift | Round to Zero Normalized | Round to Zero Shift | Round to Infinity Normalized | Round to Infinity Shift |
|---|---|---|---|---|---|---|---|---|
| +2 | 0 | 0 | QP | Q,1 | Q | Q,1 | QP | QP,1 |
| +1 | 0 | 0 | Q | Q,1 | Q | Q,0 | QP | Q,1 |
| 0 | 0 | 0 | Q | Q,0 | Q | Q,0 | QP | Q,1 |
| −1 | 0 | 0 | Q | Q,0 | QM | QM,1 | Q | Q,0 |

| Last Digit | Remainder Sign | Remainder Zero | Round to Nearest Normalized | Round to Nearest Shift | Round to Zero Normalized | Round to Zero Shift | Round to Infinity Normalized | Round to Infinity Shift |
|---|---|---|---|---|---|---|---|---|
| −2 | 0 | 0 | Q | QM,1 | QM | QM,1 | Q | Q,0 |
| +2 | 1 | 0 | Q | Q,1 | Q | Q,0 | QP | Q,1 |
| +1 | 1 | 0 | Q | Q,0 | Q | Q,0 | QP | Q,1 |
| 0 | 1 | 0 | Q | Q,0 | QM | QM,1 | Q | Q,0 |
| −1 | 1 | 0 | Q | QM,1 | QM | QM,1 | Q | Q,0 |
| −2 | 1 | 0 | QM | QM,1 | QM | QM,0 | Q | QM,1 |

8. Apparatus as recited in claim 1, wherein said round and select logic comprises a round block for positive remainders and a round block for negative remainders, wherein said round blocks each produce a quotient select signal, and said round select signal selects one of said quotient select signals to employ in selecting the final rounded quotient from said Q, QM, and QP registers;

wherein said remainder formation logic further generates a square root partial remainder $P'_{j+1}$ in accordance with the following formula for square root calculations:

$$P'_{j+1} = 2 r P'_j - q_{j+1}(2Q_j) - q_{j+1}^2(r^{-(j+1)}),$$

wherein the remainder formation logic comprises means for selecting which of said division partial remainder and square root partial remainder is generated; and wherein said remainder formation logic further comprises a partial remainder register storing a current division partial remainder $P_j$ or current square root partial remainder $P'_j$; a first walking one shift register selectively outputting a $q_{j+1}^2 r^{-(j+1)}$ term; a carry save subtract circuit operatively coupled to said first walking one shift register and to said partial remainder register, said carry save subtract circuit receiving the quantity $rP_j$ from said partial remainder register, receiving one of $q_{j+1}^2 r^{-(j+1)}$ output by said first walking one shift register or zero, and outputting $rP_j$ or $rP'_j - q_{j+1}^2 r^{-(j+1)}$; a second walking one shift register selectively outputting $q_{j+1}D$ or $q_{j+1}(2Q_j)$; and a carry save add/subtract circuit receiving the output of said carry save subtract circuit, receiving the output of said second walking one shift register, and outputting a next division partial remainder $rP_{j+1}$ or a next square root partial remainder $rP'_{j+1}$ for storage in said partial remainder register.

9. An apparatus for performing floating-point digit-by-digit division of a dividend operand by a divisor operand, comprising:

(a) digit selector means for selecting quotient digits $q_{j+1}$ to be used in iteratively constructing a quotient Q;

(b) remainder formation means for generating a division partial remainder $P_{j+1}$;

(c) quotient means for iteratively constructing a quotient Q, and for decrementing and incrementing said quotient Q to obtain a decremented quotient Q−1 and an incremented quotient Q+1;

(d) remainder compare means for receiving a rounding mode signal indicative of a selected one of a plurality of prescribed rounding modes, determining whether said partial remainder $P_{j+1}$ is zero and whether said partial remainder is less than zero, and outputting a round select signal; and (e) round and select means for selecting, as a final rounded quotient, one of Q, Q−1, and Q+1 on the basis of a last quotient digit $q_{j+1}$ and said round select signal;

wherein delays introduced by the rounding process number approximately $\log_2 n + K_2$, where $K_2$ is a constant and represents the number of bits in the quotient.

10. An apparatus as recited in claim 9, wherein said partial remainder is generated by said remainder formation means in accordance with the following formula for division:

$$P_{j+1} = rP_j - q_{j+1}D,$$

where "j" is an index representing iterations employed in constructing said quotient "$P_j$" represents the remainder at the j-th iteration, "r" represents the radix of the number system employed to represent numbers, and "D" represents a divisor.

11. An apparatus as recited in claim 9, wherein said quotient Q is constructed in accordance with the formula $$Q_{j+1} = Q_j + r^{-(j+1)} q_{j+1},$$

where "$Q_j$" represents the quotient Q at the j-th iteration.

12. An apparatus as recited in claim 9, wherein said round and select means comprises a round block for positive remainders and a round block for negative remainders, wherein said round blocks each produce a quotient select signal, and said round select signal selects one of said quotient select signals to employ in selecting the final rounded quotient.

13. Apparatus as recited in claim 9, wherein said remainder formation means further generates a square root partial remainder $P'_{j+1}$ in accordance with the following formula for square root calculations:

$$P'_{j+1} = rP'_j - q_{j+1}(2Q_j) - q_{j+1}^2(r^{-(j+1)}),$$

wherein the remainder formation means comprises means for selecting which of said division partial remainder and square root partial remainder is generated.

14. Apparatus as recited in claim 13, wherein said remainder formation logic further comprises:

a partial remainder register storing a current division partial remainder $P_j$ or current square root partial remainder $P'_j$;

a first walking one shift register selectively outputting a $q_{j+1}^2 r^{-(j+1)}$ term;

a carry save subtract circuit operatively coupled to said first walking one shift register and to said partial remainder register, said carry save subtract circuit receiving the quantity $rP_j$ from said partial remainder register, receiving one of $q_{j+1}^2 r^{-(j+1)}$ output by said first walking one shift register or zero, and outputting $rP_j$ or $rP'_j - q^2_{j+1}r^{-(j+1)}$;

a second walking one shift register selectively outputting $q_{j+1}D$ or $q_{j+1}(2Q_j)$; and a carry save add/subtract circuit receiving the output of said carry save subtract circuit, receiving the output of said second multiplexer circuit, and outputting a next division partial remainder $rP_{j+1}$ or a next square root partial remainder $rP'_{j+1}$ for storage in said partial remainder register.

15. Apparatus as recited in claim 9, wherein said prescribed rounding modes include an IEEE round to nearest mode, an IEEE round to zero mode, and an IEEE round to infinity mode.

* * * * *